(12) United States Patent
Mitchell et al.

(10) Patent No.: US 8,064,771 B2
(45) Date of Patent: Nov. 22, 2011

(54) ACTIVE CONTROL LOOP FOR POWER CONTROL OF OPTICAL CHANNEL GROUPS

(75) Inventors: Matthew L. Mitchell, Sunnyvale, CA (US); Robert B. Taylor, Charleston, SC (US); Vincent G. Dominic, Fremont, CA (US); Alan C. Nilsson, Mountain View, CA (US)

(73) Assignee: Infinera Corporation, Sunnyvale, CA (US)

( * ) Notice: Subject to any disclaimer, the term of this patent is extended or adjusted under 35 U.S.C. 154(b) by 867 days.

(21) Appl. No.: 11/425,988

(22) Filed: Jun. 22, 2006

(65) Prior Publication Data

US 2007/0003281 A1  Jan. 4, 2007

Related U.S. Application Data

(60) Provisional application No. 60/695,481, filed on Jun. 30, 2005.

(51) Int. Cl.
  *H04B 10/16* (2006.01)
  *H04B 10/00* (2006.01)
(52) U.S. Cl. ............... 398/94; 398/93; 398/38
(58) Field of Classification Search ............ 398/93, 398/94, 38, 192–198
  See application file for complete search history.

(56) References Cited

U.S. PATENT DOCUMENTS

| | | | |
|---|---|---|---|
| 4,893,353 A * | 1/1990 | Iwaoka et al. | 398/183 |
| 4,912,526 A * | 3/1990 | Iwaoka et al. | 398/196 |
| 4,933,929 A | 6/1990 | Tajima | |
| 5,111,324 A * | 5/1992 | Jahromi | 398/202 |
| 5,245,681 A * | 9/1993 | Guignard et al. | 385/16 |
| 5,276,543 A | 1/1994 | Olshansky | |
| 5,557,442 A | 9/1996 | Huber | |
| 5,664,131 A | 9/1997 | Sugiya | |
| 5,675,432 A | 10/1997 | Kosaka | |
| 5,745,275 A * | 4/1998 | Giles et al. | 398/94 |
| 5,790,289 A | 8/1998 | Taga et al. | |
| 5,815,299 A | 9/1998 | Bayart et al. | |
| 5,870,217 A | 2/1999 | Itou et al. | |
| 5,923,450 A | 7/1999 | Dugan et al. | |
| 5,995,274 A * | 11/1999 | Sugaya et al. | 359/337 |
| 6,025,947 A * | 2/2000 | Sugaya et al. | 398/97 |
| 6,055,092 A * | 4/2000 | Sugaya et al. | 359/337 |
| 6,104,848 A * | 8/2000 | Toyohara et al. | 385/24 |
| 6,144,485 A * | 11/2000 | Sugaya et al. | 359/337 |

(Continued)

FOREIGN PATENT DOCUMENTS

EP   0828357 A3   3/1998

(Continued)

*Primary Examiner* — Danny Leung
(74) *Attorney, Agent, or Firm* — W. Douglas Carothers; North Weber & Baugh LLP; David L. Soltz

(57) ABSTRACT

A system, apparatus and method are described for deployment of a control loop between optical or electro-optical modules and a multiplexing module to provide a desired power profile of banded optical channel groups. The power output characteristics of the optical or electro-optical modules, the properties of the transmission paths of the banded optical channel groups, and other factors may be analyzed to allow the control loop to achieve the desired power profile on the banded optical channel groups. The control loop may adjust the output power on the optical or electro-optical modules so that the banded optical channel groups are delivered to an optical component, such as an optical multiplexer or photo-detector, having a particular optical power profile.

7 Claims, 5 Drawing Sheets

U.S. PATENT DOCUMENTS

| | | | |
|---|---|---|---|
| 6,157,475 A * | 12/2000 | Dugan et al. | 398/26 |
| 6,157,481 A * | 12/2000 | Sugaya et al. | 359/337 |
| 6,198,572 B1 * | 3/2001 | Sugaya et al. | 359/337 |
| 6,271,945 B1 * | 8/2001 | Terahara | 398/26 |
| 6,323,994 B1 * | 11/2001 | Li et al. | 359/341.1 |
| 6,392,769 B1 * | 5/2002 | Ford et al. | 398/9 |
| 6,437,320 B1 * | 8/2002 | Yoshida et al. | 250/227.11 |
| 6,456,408 B1 * | 9/2002 | Moeller | 398/79 |
| 6,594,043 B1 * | 7/2003 | Bloom et al. | 398/15 |
| 6,594,046 B1 * | 7/2003 | Nishino | 359/239 |
| 6,611,637 B1 * | 8/2003 | Okuno et al. | 385/24 |
| 6,631,026 B2 * | 10/2003 | Kinoshita et al. | 359/341.33 |
| 6,636,681 B2 * | 10/2003 | Ji et al. | 385/140 |
| 6,646,791 B2 * | 11/2003 | Sugaya et al. | 359/341.41 |
| 6,658,217 B2 * | 12/2003 | Ohhata et al. | 398/202 |
| 6,671,469 B1 * | 12/2003 | Fukagawa et al. | 399/30 |
| 6,707,963 B2 * | 3/2004 | Kawarai | 385/24 |
| 6,731,877 B1 * | 5/2004 | Cao | 398/91 |
| 6,735,395 B1 * | 5/2004 | Bai | 398/95 |
| 6,748,179 B2 * | 6/2004 | Lange et al. | 398/177 |
| 6,810,214 B2 * | 10/2004 | Chbat et al. | 398/160 |
| 6,865,016 B2 * | 3/2005 | Sugaya et al. | 359/337 |
| 6,873,456 B2 * | 3/2005 | Motoshima et al. | 359/337.11 |
| 6,941,075 B2 * | 9/2005 | Michishita et al. | 398/94 |
| 6,961,524 B1 * | 11/2005 | Foo | 398/197 |
| 7,020,092 B1 * | 3/2006 | Weiske et al. | 370/252 |
| 7,039,318 B2 * | 5/2006 | Graves | 398/81 |
| 7,043,160 B1 * | 5/2006 | Graves | 398/98 |
| 7,079,772 B2 * | 7/2006 | Graves et al. | 398/95 |
| RE39,378 E * | 11/2006 | Dugan et al. | 398/95 |
| 7,183,770 B2 * | 2/2007 | Graßlin et al. | 324/322 |
| 7,227,681 B2 * | 6/2007 | Sugaya et al. | 359/337.1 |
| 7,312,909 B2 * | 12/2007 | Glingener et al. | 398/98 |
| 7,369,777 B2 * | 5/2008 | Jasti et al. | 398/147 |
| 7,433,606 B2 * | 10/2008 | Wernlund et al. | 398/202 |
| 2002/0001115 A1 * | 1/2002 | Ishida et al. | 359/180 |
| 2002/0015199 A1 * | 2/2002 | Eder et al. | 359/110 |
| 2002/0018265 A1 * | 2/2002 | Graves | 359/128 |
| 2002/0126348 A1 * | 9/2002 | Lange et al. | 359/124 |
| 2003/0053750 A1 * | 3/2003 | Yang et al. | 385/27 |
| 2003/0170028 A1 * | 9/2003 | Mori et al. | 398/79 |
| 2004/0120712 A1 * | 6/2004 | Ng et al. | 398/41 |
| 2004/0161234 A1 * | 8/2004 | Ozawa | 398/33 |
| 2006/0050751 A1 * | 3/2006 | Sakamoto | 372/32 |
| 2006/0182441 A1 * | 8/2006 | Kish et al. | 398/33 |
| 2006/0263094 A1 * | 11/2006 | Setti et al. | 398/152 |
| 2007/0003281 A1 * | 1/2007 | Mitchell et al. | 398/38 |
| 2007/0092197 A1 * | 4/2007 | Mitchell et al. | 385/140 |
| 2009/0086310 A1 * | 4/2009 | Sugaya et al. | 359/337.1 |
| 2009/0257115 A1 * | 10/2009 | Komaki et al. | 359/337 |

FOREIGN PATENT DOCUMENTS

| | | |
|---|---|---|
| EP | 0828357 A2 | 11/1998 |
| EP | 1073227 A2 | 1/2001 |
| EP | 1178622 A2 | 2/2002 |
| JP | 7-030520 | 1/1995 |
| WO | WO 99/17485 | 4/1999 |

* cited by examiner

ACTIVE CONTROL LOOP FOR POWER CONTROL OF OPTICAL CHANNEL GROUPS

CROSS REFERENCE TO RELATED PATENT APPLICATIONS

This application claims priority to U.S. Provisional Application Ser. No. 60/695,481, entitled "Active Control Loop Circuit to Power Balance or Power Offset Banded Optical Channel Groups (BOCGs)," filed Jun. 30, 2005, which application is incorporated herein by reference in its entirety.

BACKGROUND

A. Technical Field

This application relates to optical signal power control, and more particularly, to feedback control of an optical gain or loss that is applied to an optical channel group(s).

B. Background of the Invention

The importance of optical networking technology in today's society is well understood. Optical networks transmit large amounts of information at high data rates. Optical networks may also transmit information across long distances using fiber optic cables. Typically, multiple optical wavelengths or channels are multiplexed together and transmitted into this cable. The power level of these optical channels should be maintained within a preferred range to ensure that information within these channels may be efficiently recovered.

Optical amplifiers or attenuators provide a gain to a signal that effectively increases or decreases the power associated with the signal. These optical amplifiers may be used to ensure that a power level or optical profile of an optical signal falls within a preferred power range. Certain optical components, such as photo-detectors and optical multiplexers, are designed to operate within a particular range of optical power. If an optical signal is not within this power range, then the component may generate errors in its operation.

Optical multiplexers may require that an optical channel have certain power characteristics in order to properly multiplex that channel within a wave-division multiplexed signal. FIG. 1 illustrates an example of an optical multiplexing module that multiplexes multiple banded optical channels. As shown, a plurality of banded optical channel source modules 110 transmit banded optical channels onto paths 120 to a multiplexing module 150. An N:1 multiplexer 160 receives each of the banded optical channels 120 and combines them into a single wave-division multiplexed signal 170.

The output characteristics of each of the banded optical channel group source modules 110 may vary depending on the vendors, ages and operating temperatures of modules 110. Furthermore, the optical paths 120 typically have different transmission characteristics which may affect the optical signals differently. As a result, the banded optical signals may have different characteristics, such as average power levels, at the multiplexer 160.

FIG. 2 illustrates an exemplary plot of the optical profile of the banded optical channel groups at the multiplexer 160. The plot shows a preferred power level 210 for the multiplexer 160. A first banded optical channel group, having a first set of channels 230, is shown as having the preferred power level 210. A second banded optical channel group, having a second set of channels 240, is shown as having a power level above the preferred power level 210. A third banded optical channel group, having a third set of channels 250, is shown as having a power level below the preferred power level 210.

When combining optical channels together, it may be desirable to have the channels have equal power for flatness or to purposefully render them to have a relative power profile that is of a certain desired shape. An undesired variable optical power profile at the multiplexer 160 may cause the multiplexer 160 to operate outside of a preferred power level range and may potentially result in the generation of errors. Desired channel "pre-emphasis" is typically done by an optical amplifier or attenuator on a channel-by-channel basis. For example, channel pre-emphasis may be performed by making use of a spectrum analyzer or per channel power meter to provide the feedback needed to create the change in powers be it by an amplifier or attenuator.

This optical power profile may change overtime as the banded optical channel group source modules age and/or the characteristics of the transmission paths 120 vary. For example, a laser's output characteristics may change of time as it ages or its temperature increases. This change in laser output may cause an optical channel group power level to wander outside of a preferred power range.

SUMMARY OF THE INVENTION

A system, apparatus and method are described for controlling the optical power profile of one or more banded optical channel groups at a device or location within an optical signal path. In one embodiment of the invention, an active control loop is provisioned between a plurality of optical modules and a multiplexing module. The active control loop dynamically controls the power output of the optical modules in order to provide a preferred power profile of banded optical channel groups at the aggregation point or multiplexer in the multiplexing module. In one implementation, the plurality of optical modules is a plurality of banded channel source modules.

The optical modules have variable power outputs that may adjust the power level of an optical signal, such as a banded optical channel group signal. In one embodiment, each of the optical modules comprises a variable optical attenuator. In other embodiments, a variable optical amplifier may be deployed within the optical modules.

Control loop circuitry may be deployed within the optical modules, on the active control loop or otherwise external to the optical modules, in order to measure detected power levels on the banded optical channel groups and compare these measurements relative to one or more target power levels. In response to these comparisons, the active control loop may adjust the power output on one or more of the optical modules in order to improve the power profile of the banded optical channel groups.

One skilled in the art will recognize that the preferred power profile may be modeled in order to compensate for loss variations and other signal degradation. In one embodiment, the loss variations between a plurality of banded channel source modules and a multiplexing module are compensated by adjusting the output power of the modules as these variations change overtime. The active control loop effectively monitors power levels on the banded optical channel groups, determines when one or more of the groups' power level drifts, and adjusts a corresponding output(s) on the optical module(s) accordingly.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A system, apparatus and method are described for deployment of a control loop between optical or electro-optical modules and a multiplexing module to provide a desired power profile of banded optical channel groups. The power output characteristics of the optical or electro-optical modules, the properties of the transmission paths of the banded optical channel groups, and other factors may be analyzed to allow the control loop to achieve the desired power profile on the banded optical channel groups. The control loop may adjust the output power on the optical or electro-optical modules so that the banded optical channel groups are delivered to an optical component, such as an optical multiplexer or photo-detector, having a particular optical power profile.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
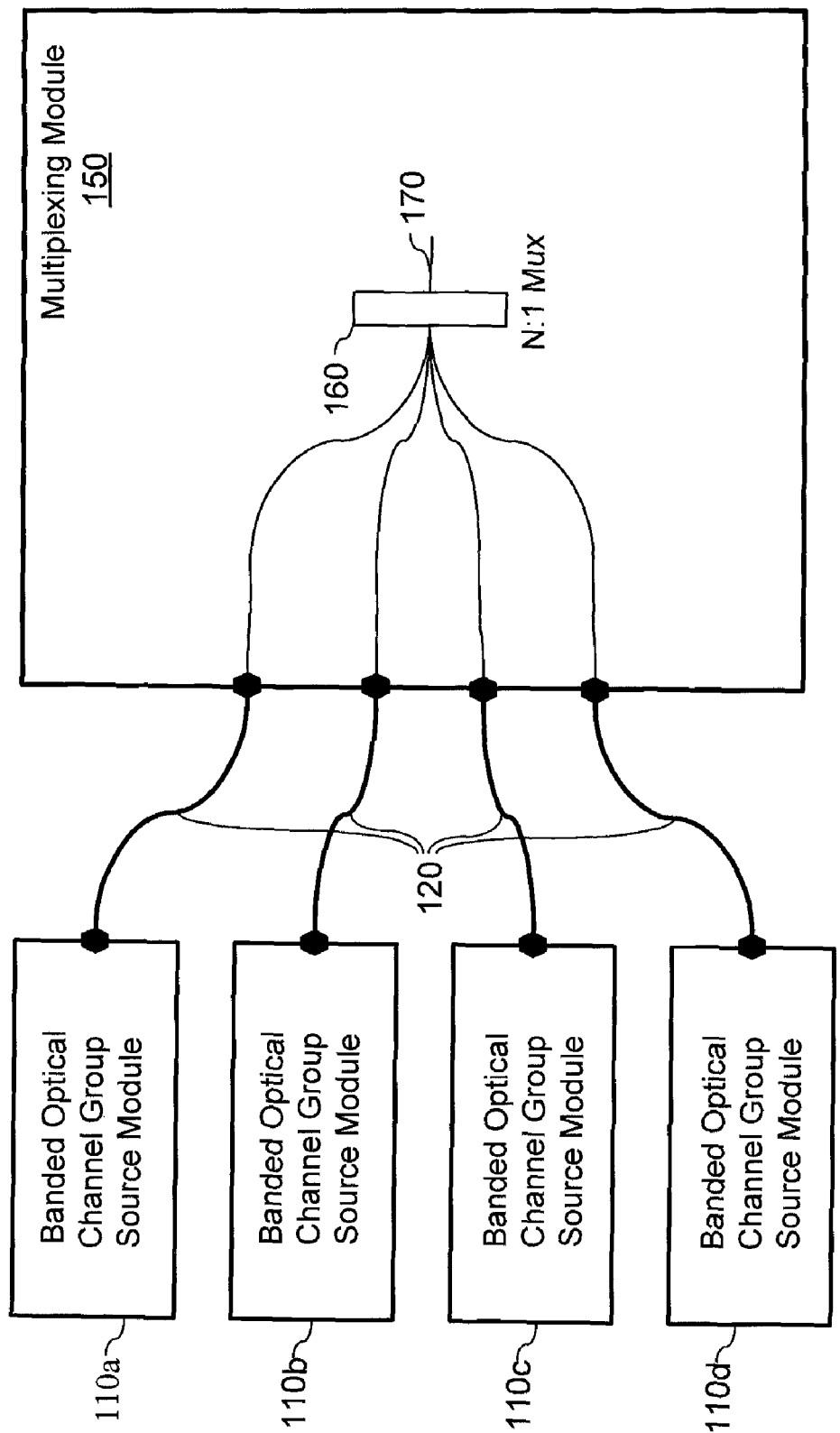
FIG. 1 is a prior art diagram of a multiplexing module that multiplexes banded optical channel groups into an optical signal.
Figure 2:
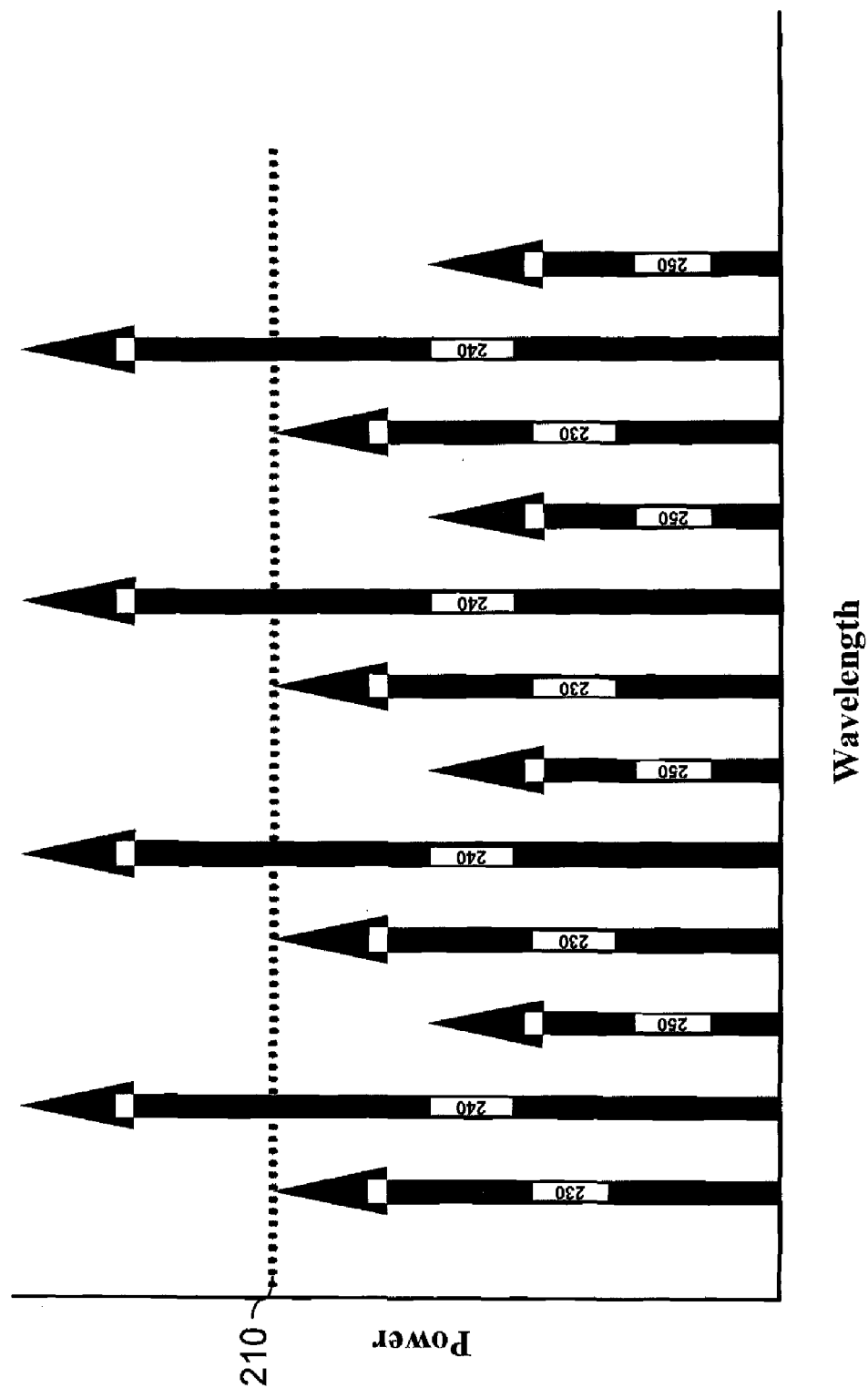
FIG. 2 is an exemplary optical profile of multiple banded optical channel groups.
Figure 3:
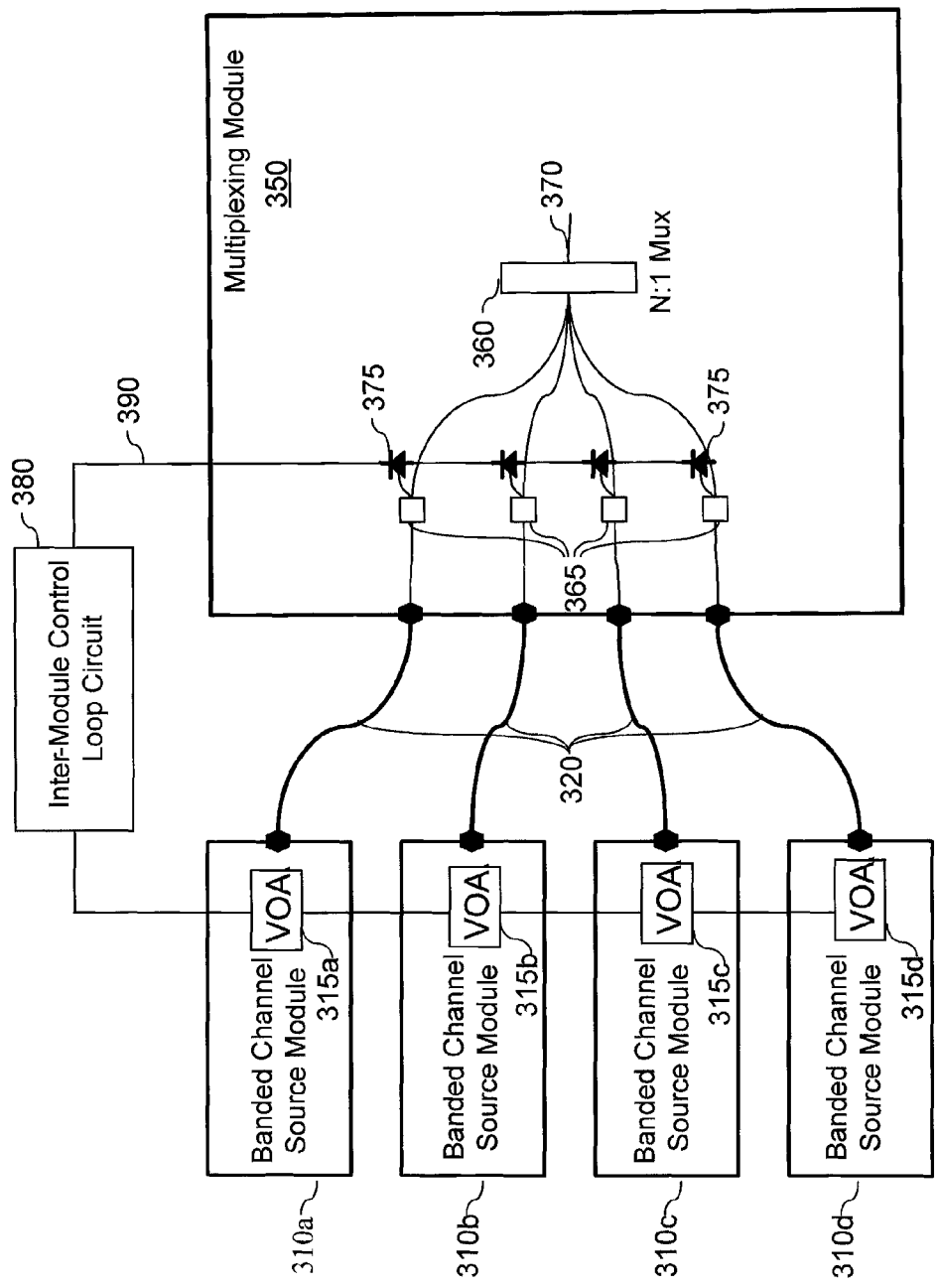
FIG. 3 is a multiplexing module having an active control loop that couples with a plurality of banded channel source modules according to one embodiment of the invention.

FIG. 3 illustrates a multiplexing module, a plurality of banded channel source modules, and an inter-module control loop according to one embodiment of the invention. In this example, the banded channel source modules 310 include a variable optical attenuator 315 that attenuates a power level on a banded optical channel group. In other embodiments of the invention, an optical amplifier may be provided or used in combination with an attenuator to control the output power on the banded channel source modules 310.

Each banded channel source module 310 has an associated transmission path 320 to the multiplexing module 350. The multiplexing module 350 contains an N:1 multiplexer 370 that receives each of the banded optical channel groups and multiplexes them into a single wave-division multiplexed signal. The multiplexing module 350 also contains optical taps 365 on at least some of the transmission paths 320 and associated photodiodes 375 that convert tapped optical signals into electrical signals.

An active control loop 390 couples the multiplexing module 350 to at least some of the banded channel source modules 310. In one embodiment, this active control loop 390 is used to control the power output of each of the banded channel source modules 310 so that a preferred optical power profile of banded optical signal groups is delivered at the multiplexer 370. In other embodiments of the invention, the power output of each of the banded channel source modules 310 is controlled so that a preferred optical power profile of banded optical signal groups is delivered to various locations or components within an optical communication link. The active control loop 390 may comprise inter-module control loop circuitry 380 that processes the electrical signals generated from the tapped optical signals.

Banded channel signals are groups of multiplexed channel signals or optical channel groups where each group, as subsequently banded, comprises a plurality of individual optical channel signals of different wavelength. The optical channel groups are banded together to form an output comprising banded optical channel groups that are received from the banded channel source modules 310. The banded channel signals could originate from a single module or may have been multiplexed into a band from a plurality of different optical modules. The output power of the banded channel signals should be variable to allow for power balancing and control across the bands of optical channel groups. The variable output of the banded channel source modules 310 may be controlled by the active control loop 390 in order to provide an optical profile at one or more locations or components within an optical signal path.

In one embodiment of the invention, the actual power level on the output of the banded channel source modules 310 is defined by tuning a variable optical attenuator 315 in the modules 310. The power levels on these modules may be used to balance power across the banded optical channel groups. The amount of power balancing required may be dependent upon various design parameters and transmission characteristics of one or more optical paths.

The active control loop 390 may be used to compensate for loss variations that may affect an optical power profile. For example, output power variations in the banded optical channel group outputs across the banded channel source modules 310 may be compensated by the active control loop 390. In another example, optical loss variations across patch cables connecting the source modules 310 to the multiplexing module 350 may be compensated by the active control loop 390. In yet another example, optical loss variations from input ports of the multiplexing module 350 to the common aggregation point after the N:1 multiplexer 370 may be compensated by the active control loop 390. One skilled in the art will recognize that other causes of optical loss variations may be addressed by the present invention.

The optical loss variations may be detected and managed using various techniques. For example, the optical loss from each banded channel source module 310 input to the multiplexing module 350 aggregation point is measured during assembly. These losses will have a variation from module to module during manufacture due to differences in manufacturing tolerances and other associated sources of optical component loss variations. The amount of total optical losses are determined and derived from these variations. These losses are employed to create a target power for each banded optical channel group that should occur at each input port to the multiplexing module 350 in order to achieve the desired power at the common aggregation point of the multiplexing module 350.

In one embodiment, if a desired optical power profile across signal channels or across banded optical channel groups should be equal across the signal wavelength grid at the multiplexer 370, then the target powers of each input port to the multiplexing module 350 would be the common target power at the aggregation point plus the optical path loss from these respective ports to the multiplexing module aggregation point 370. Using the integrated taps 365 and photodiodes 375 at each port input of the multiplexing module 350, the power levels at the port inputs can be readily determined. An inter-module control loop circuit 380 is provided that continuously measures the input power from the respective port inputs via the photodiodes 375 and compares those measured values to the input ports' target power. The difference between these two values is communicated to each banded channel source module 310 which may adjust its output power in a direction required to make the actual and target power match.

Figure 4:
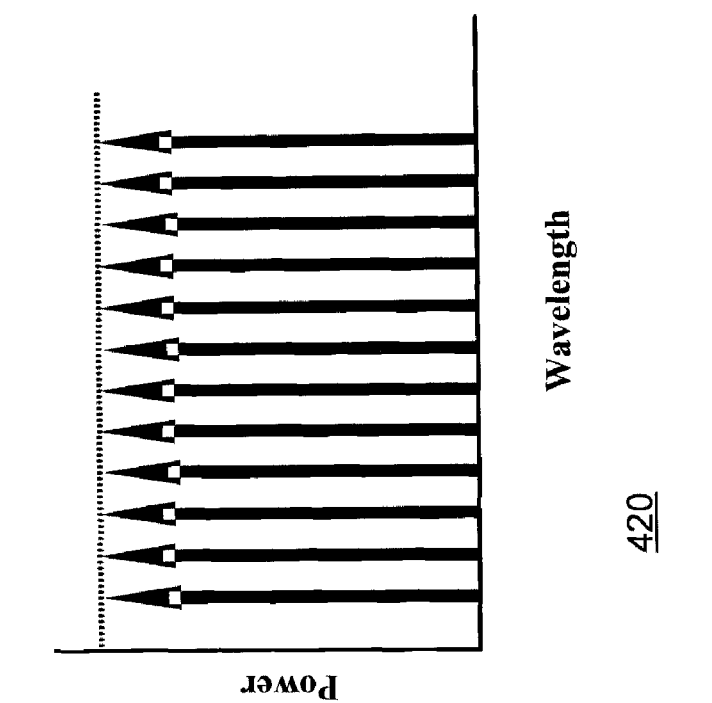
FIG. 4 illustrates exemplary optical profiles of multiple banded optical channel groups according to one embodiment of the invention.
Figure 4:
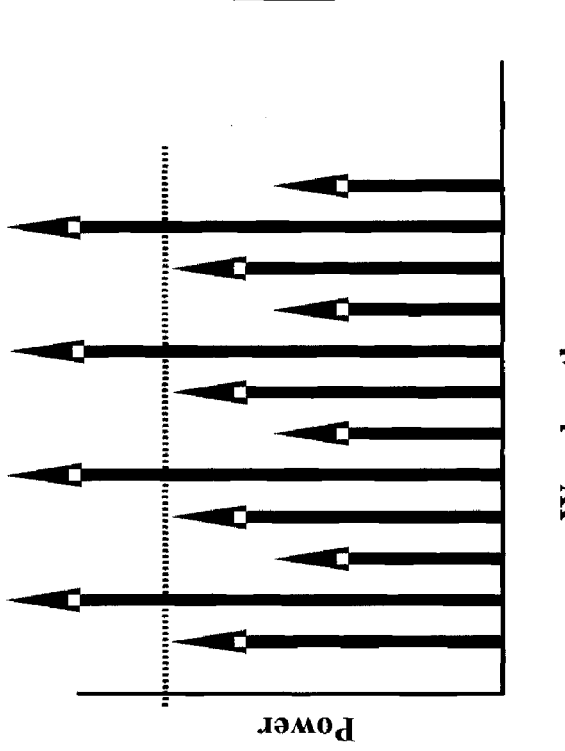

Any drift within the optical power profile of the optical channel groups at the multiplexer 370 may be identified and compensated using the active control loop 390. Referring to FIG. 4, an undesirable power profile is shown in the first plot 410 and may result from various types of variations and losses within the optical path. This undesirable power profile 410 may be adjusted to a preferred flat power profile 420 by changing the output on the banded channel source modules 310. As previously mentioned, the banded channel source modules 310 may have either variable optical attenuators 315 and/or variable optical amplifiers to control the output power.

In this particular example, each banded optical channel group, within the banded optical channel groups, should have equal power levels, as illustrated in plot 420. The active control loop circuit 380 may also be employed to create a power offset between each optical channel group in the banded optical channel groups, such as in the case of matching an optical amplifier gain tilt. In other embodiments, the preferred power profile may not be flat but have other shapes depending on various design and communication parameters.

In another embodiment of the invention, an attenuating or gain element or a combination element thereof may be located within the multiplexing module 350 to control the target powers such as positioned in each optical line between the multiplexing module photodiodes 375 and the multiplexer 370.

Figure 5:
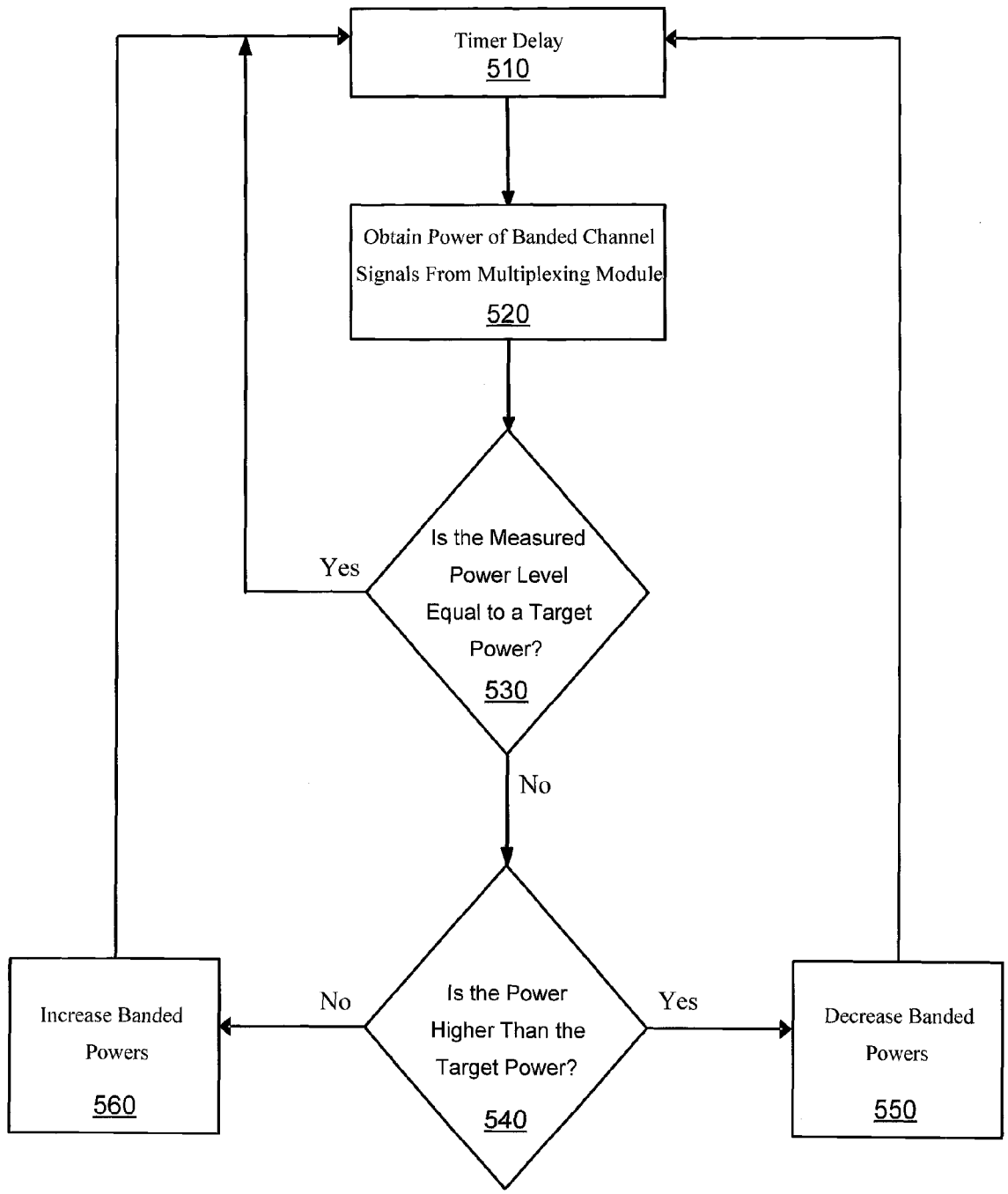
FIG. 5 is a flowchart showing a method for controlling banded optical channel groups that are to be multiplexed into a wave-division multiplexed optical signal according to one embodiment of the invention.

FIG. 5 illustrates a method, independent of structure, for controlling the power profile of a banded optical channel group according to one embodiment of the invention. A delay 510 is provided to control the sampling of optical power on one or more optical channel groups. At an appropriate time, a banded channel signal is tapped and a power level obtained 520. After a sample is taken, the power level on the sampled optical signal is compared 530 to a target power. If the sampled power level is equal or approximately equal to the target power, then no adjustment is made. If there is a sufficient different between the sampled power level and the target power, then the optical power of the banded channel signal is adjusted 540.

If the sampled optical signal power is higher than the target power, then the banded power that was sampled is increased 560. If the sampled optical signal power is lower than the target power, then the banded power that was sampled is decreased 550. As a result, optical channel group power deviations from a target power are able to be quickly identified and compensated.

While the foregoing described embodiment has involved banded channel signals or banded optical channel groups, the output from the source modules alternatively can be a single channel signal from each source module or a single (unbanded) optical channel group signal comprising two or more multiplexed optical channel signals. As used herein, "channel" has reference to a single modulated source having a given wavelength output that is modulated according to an electrical information signal provided either in modulating a light source, such as a semiconductor laser, or modulating an external modulator that receives light from such a light source. See, for example, U.S. published application No. 2003/0095737, published on May 22, 2003 which is patent application, Ser. No. 10/267,331, filed Oct. 8, 2002, which application is incorporated herein by its reference.

While various embodiments of the present invention have been described above, it should be understood that they have been presented by way of examples, and not limitation. It will be apparent to persons skilled in the relevant art that various changes in form and detail may be made therein without departing from the spirit and the scope of the invention.

We claim:

1. A system comprising:
    a first banded channel source module that outputs a first banded optical channel group including a first plurality of optical channels, each of the first plurality of optical channels having a corresponding one of a first plurality of wavelengths,
    a second banded channel source module that outputs a second banded optical channel group including a second plurality of optical channels, each of the second plurality of optical channels having a corresponding one of a second plurality of wavelengths,
    a first optical tap, coupled to the first banded channel source module, that supplies a portion of the first banded optical channel group, the portion of the first banded optical channel group including a portion of each of the first plurality of optical channels,
    a first photodiode, coupled to the first optical tap, that simultaneously receives said portion of each of the first plurality of optical channels and outputs a first electrical signal;
    a control circuit coupled to receive the first electrical signal, the control circuit being configured to supply a first control output in response to the first electrical signal;
    a first variable optical attenuator configured to receive the first banded optical channel group and the first control output, such that an attenuation of the first variable optical attenuator being adjusted in response to said first control output, wherein the first control output is based, at least in part, on said portion of each of the first plurality of optical channels simultaneously received by the first photodiode;
    a second optical tap, coupled to the second banded channel source module, that supplies a portion of the second banded optical channel group,
    a second photodiode that simultaneously receives the portion of the second banded optical channel group including a portion of each of the second plurality of optical channels, wherein the control circuit is coupled to receive the second electrical signal, the control circuit further supplying a second control output in response to the second electrical signal; and a second variable optical attenuator configured to receive the second banded optical channel group and the second control output, an attenuation of the second variable optical attenuator being adjusted in response to the second control output, wherein the second control output is based, at least in part, on said portion of each of the second plurality of optical channels simultaneously received by the second photodiode.

2. The system of claim 1, further including a multiplexer that multiplexes the first banded optical channel group and the second banded optical channel group.

3. The system of claim 1 wherein the multiplexer is integrated within an optical multiplexing module that generates a wavelength division multiplexed optical signal.

4. The system of claim 1 wherein the photodiode is a PIN diode.

5. The system of claim 1 wherein the photodiode is an avalanche photodiode.

6. The system of claim 1 wherein the control circuit comprises inter-module control loop circuitry.

7. A system in accordance with claim 1, wherein the power level associated with the first optical banded optical channel group is a first power level, the first power level at an output of the first variable optical attenuator being substantially equal to a second power level associated with the second banded optical channel group at an output of the second variable optical attenuator.

* * * * *